(12) United States Patent
Liou et al.

(10) Patent No.: US 6,698,559 B1
(45) Date of Patent: Mar. 2, 2004

(54) HYDRAULIC DAMPING DEVICE

(76) Inventors: Wen-Guey Liou, No. 10, Lane 54, Sec. 3, Reh Her Rd., Taichung (TW); Chao-Hsuan Liu, No. 36, Hsing Feng Shan Chuang, Tan Tzu Hsiang, Taichung Hsien (TW); Yu-Chih Liu, No. 179, Sec. 1, Tan Hsing Rd., Chu Hsing Village, Tan Tzu Hsiang, Taichung Hsien (TW); Chieh-Feng Liu, No. 2, Alley 9, Lane 23, Ta Hsin Rd., Fu Jen Village, Tan Tzu Hsiang, Taichung Hsien (TW)

( * ) Notice: Subject to any disclaimer, the term of this patent is extended or adjusted under 35 U.S.C. 154(b) by 0 days.

(21) Appl. No.: 10/347,342

(22) Filed: Jan. 21, 2003

(51) Int. Cl.[7] .............................. F16F 9/49; B62K 25/08
(52) U.S. Cl. ........................ 188/317; 188/286; 280/276
(58) Field of Search ......................... 267/34, 286, 289, 267/291; 188/280–289, 310–322.22

(56) References Cited

U.S. PATENT DOCUMENTS

| | | | | |
|---|---|---|---|---|
| 3,750,856 A | * | 8/1973 | Kenworthy | 188/280 |
| 4,328,960 A | * | 5/1982 | Handke et al. | 188/284 |
| 4,838,393 A | * | 6/1989 | Mourray et al. | 188/284 |
| 5,106,065 A | * | 4/1992 | Staton et al. | 267/64.11 |
| 5,738,190 A | * | 4/1998 | Deferme | 188/280 |
| 6,513,822 B1 | * | 2/2003 | Chonan | 280/276 |
| 6,626,274 B2 | * | 9/2003 | Pfundstein et al. | 188/284 |

* cited by examiner

*Primary Examiner*—Christopher P. Schwartz
(74) *Attorney, Agent, or Firm*—Rosenberg, Klein & Lee

(57) ABSTRACT

A hydraulic damping device has a cylinder, a rod, a piston, a first biasing member, a seal and a second biasing member. The rod moveably extends into the cylinder. The piston is securely attached to the rod to divide the cylinder into two chambers. The piston has multiple first channels and multiple second channels communicating with the chambers, wherein each first channel has a diameter larger than that of each second channel. The first biasing member is connected to the rod to provide a recoil force to the rod. The seal is moveably mounted on the rod and abuts against the piston to close the first channels in the piston. The second biasing member is mounted on the rod to provide a force to push the seal. Accordingly, the hydraulic damping device has a capability of adjusting the damping effect and has a simplified structure.

18 Claims, 9 Drawing Sheets

HYDRAULIC DAMPING DEVICE

BACKGROUND OF THE INVENTION

1. Field of the Invention

The present invention relates to a damping device, and more particularly to an adjustable hydraulic damping device with a simplified structure.

2. Description of Related Art

A hydraulic damping device is used as a shock-absorbing device on a bicycle or a flow controller in a flow discharging system. The conventional hydraulic damping device has an adjusting device for adjusting the damping effect provided by the damping device. However, the conventional hydraulic damping device with an adjusting device has a complex structure, and the cost for manufacturing the conventional damping device is excessive.

To overcome the shortcomings, the present invention tends to provide a hydraulic damping device or obviate the aforementioned problems.

SUMMARY OF THE INVENTION

The main objective of the invention is to provide a hydraulic damping device with a simplified structure. The hydraulic damping device has a cylinder, a rod, a piston, a first biasing member, a seal and a second biasing member. A top cap and a bottom cap are respectively attached to the top end and the bottom end of the cylinder. The rod moveably extends through the bottom cap and into the space in the cylinder. The piston is securely attached to the rod and is received in the cylinder to divide the space in the cylinder into a first chamber and a second chamber. The piston has multiple first channels and multiple second channels defined through the piston and communicating with the first chamber and the second chamber in the cylinder, wherein each first channel has a diameter larger than that of each second channel. Working fluid is contained in the space of the cylinder at an original pressure. The first biasing member has a resiliency and is connected to the rod to provide a recoil force to the rod. The seal is moveably mounted on the rod, and is received in the second chamber to abut the piston to close the first channels in the piston. The second biasing member has a resiliency and is mounted on the rod to provide a force to push the seal to abut against the piston. Accordingly, the hydraulic damping device has a capability of adjusting the damping effect and has a simplified structure.

Other objects, advantages and novel features of the invention will become more apparent from the following detailed description when taken in conjunction with the accompanying drawings.

DETAILED DESCRIPTION OF PREFERRED EMBODIMENT

Figure 1:
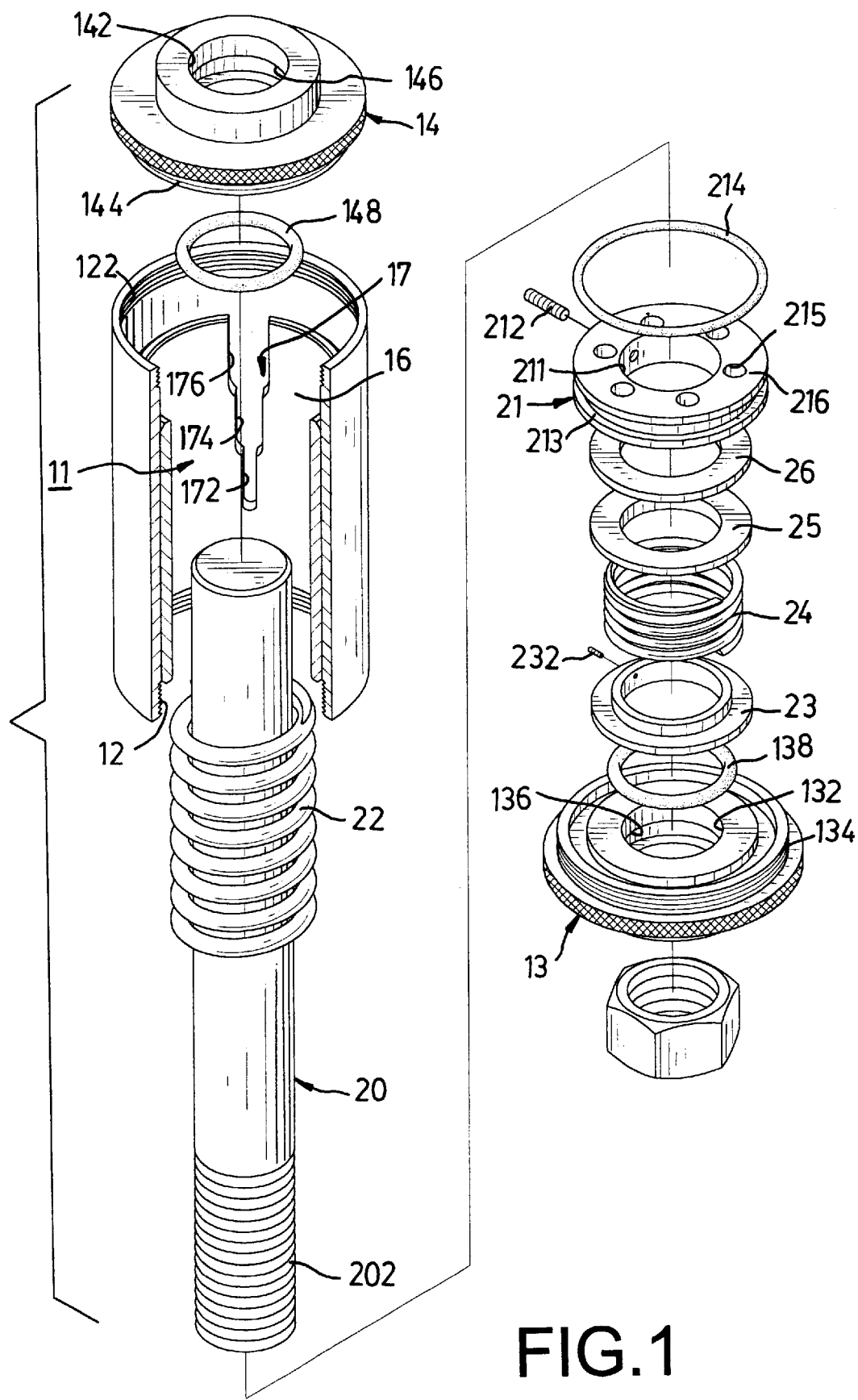
FIG. 1 is an exploded perspective view of a first embodiment of a hydraulic damping device in accordance with the present invention.
Figure 2:
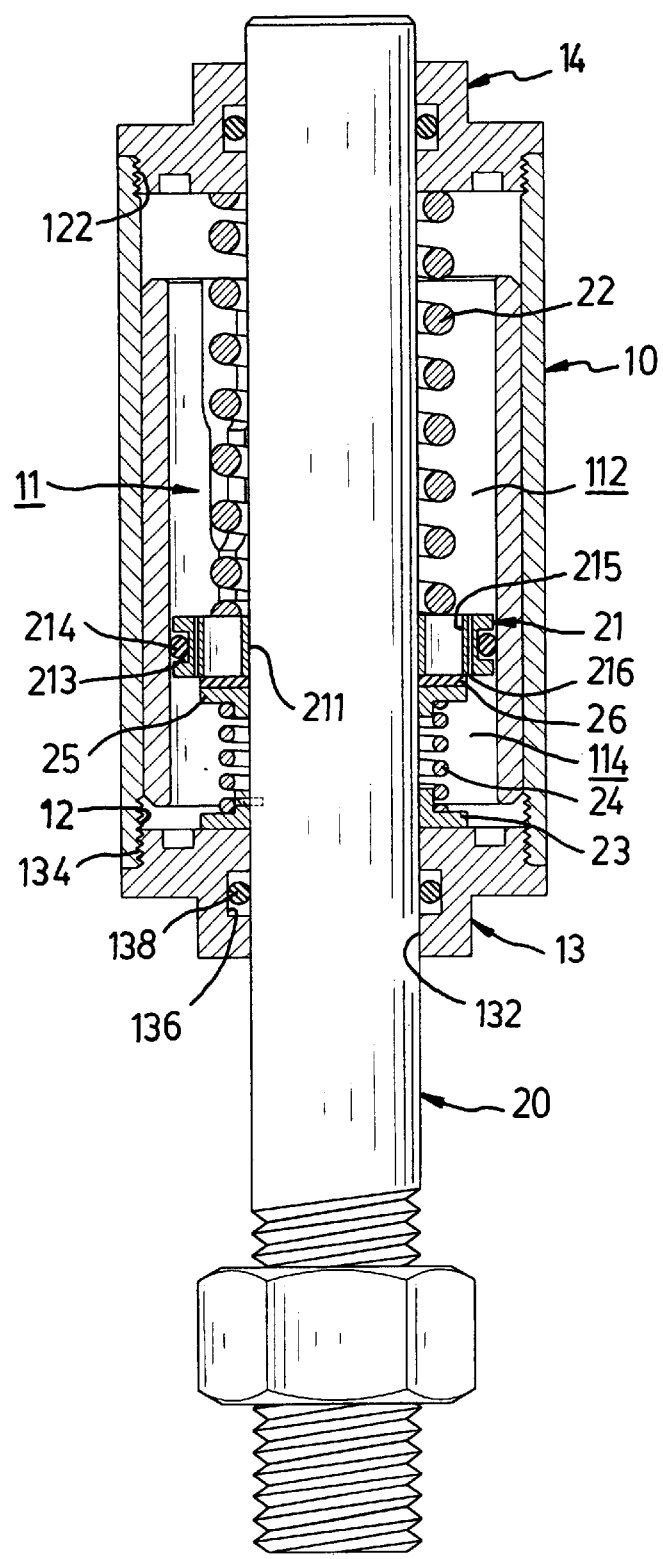
FIG. 2 is a side plan view in partial cross section of the first embodiment of the hydraulic damping device in FIG. 1.

With reference to FIGS. 1 and 2, a hydraulic damping device in accordance with the present invention comprises a cylinder (10), a rod (20), a piston (21), a first biasing member (22), a seal (26) and a second biasing member (24). The cylinder (10) with a space (11) has a top end (122) and a bottom end (12) respectively provided with an inner thread.

A top cap (14) with an outer thread (144) is screwed with the inner thread in the top end (122) of the cylinder (10), and a bottom cap (13) with an outer thread (134) is screwed with the inner thread in the bottom end (12) of the cylinder (10). A central hole (132) is defined through the bottom cap (13). An annular recess (136) is defined in an inner surface defining a central hole (132) in the bottom cap (13). An O-ring (138) is received in the recess (136) in the bottom cap (13). Working fluid is contained in the space (11) of the cylinder (10) at an original pressure.

The rod (20) moveably extends through central hole (132) in the bottom cap (13) and into the cylinder (10). In a first embodiment, a central hole (142) is defined through the top cap (14). An annular recess (146) is defined in the inner surface of central hole (142) in the top cap (14). An O-ring (148) is received in the recess (146) in the bottom cap (14). The rod (20) extends through the central hole (142) in the top cap (14) and out from the top end (122) of the cylinder (10). The O-rings (138,148) in the bottom cap (13) and the top cap (14) can provide excellent sealing effect to the rod (20).

The piston (21) is securely attached to the rod (20) and is received in the cylinder (10) to divide the space (11) in the cylinder (10) into a first chamber (112) and a second chamber (114). A central hole (211) is defined through the piston (21) for the rod (20) extending through the central hole (211). A threaded pin (212) is screwed into the piston (21) and has a free end abutting against the rod (20), such that the piston (21) is securely attached to the rod (20) by means of the threaded pin (212).

The piston (21) has multiple first channels (215) and second channels (216) defined through the piston (21) and communicating with the first chamber (112) and the second chamber (114). The first channels (215) are co-axially arranged around the central hole (211), and the second channels (216) are co-axially arranged between the outer periphery of the piston (21) and the first channels (215). Each first channel (215) has a diameter much larger than that of each second channel (216). An annular recess (213) is defined in the outer surface of the piston (21), and an O-ring (214) is received in the annular recess (213) in the piston (21).

A tubular lining (16) is mounted in the cylinder (10) and abuts the O-ring (214) in the recess (213) in the piston (21). A feedback channel (17) is longitudinally defined in the inner surface of the lining (16) along the axial direction of the cylinder (10). The feedback channel (17) comprises a first segment (172), a second segment (174) and a third segment (176) linearly arranged from one end of the lining (16) away from the top cap (14). The width of the first segment (172) is smaller than that of the second segment (174), and the width of the second segment (174) is smaller than that of the third segment (176).

The first biasing member (22) with a resiliency is connected to the rod (20) to provide a recoil force to the rod (20). In the first embodiment, the first biasing member (22) is mounted around the rod (20) and is received in the first chamber (112) in the cylinder (10). Two ends of the first biasing member (22) respectively abut against the top cap (14) and the piston (21).

The seal (26) is moveably mounted on the rod (20), and is received in the second chamber (114) to abutagainst the piston (21) and to close the first channels (215) in the piston (21).

The second biasing member (24) with a resiliency is mounted on the rod (20) to provide a force to push the seal (26) to abut against the piston (21). In practice, a pushing base (25) is moveably mounted on the rod (20) and abuts against the seal (26). An annular securing base (23) is secured to the rod (20) by means of a threaded pin (232). The second biasing member (24) is located between the pushing base (25) and the securing base (23) and has two ends respectively abutting against the pushing base (25) and the securing base (23). The resiliency of the second biasing member (24) is smaller than the resiliency of the first biasing member (22).

Figure 3:
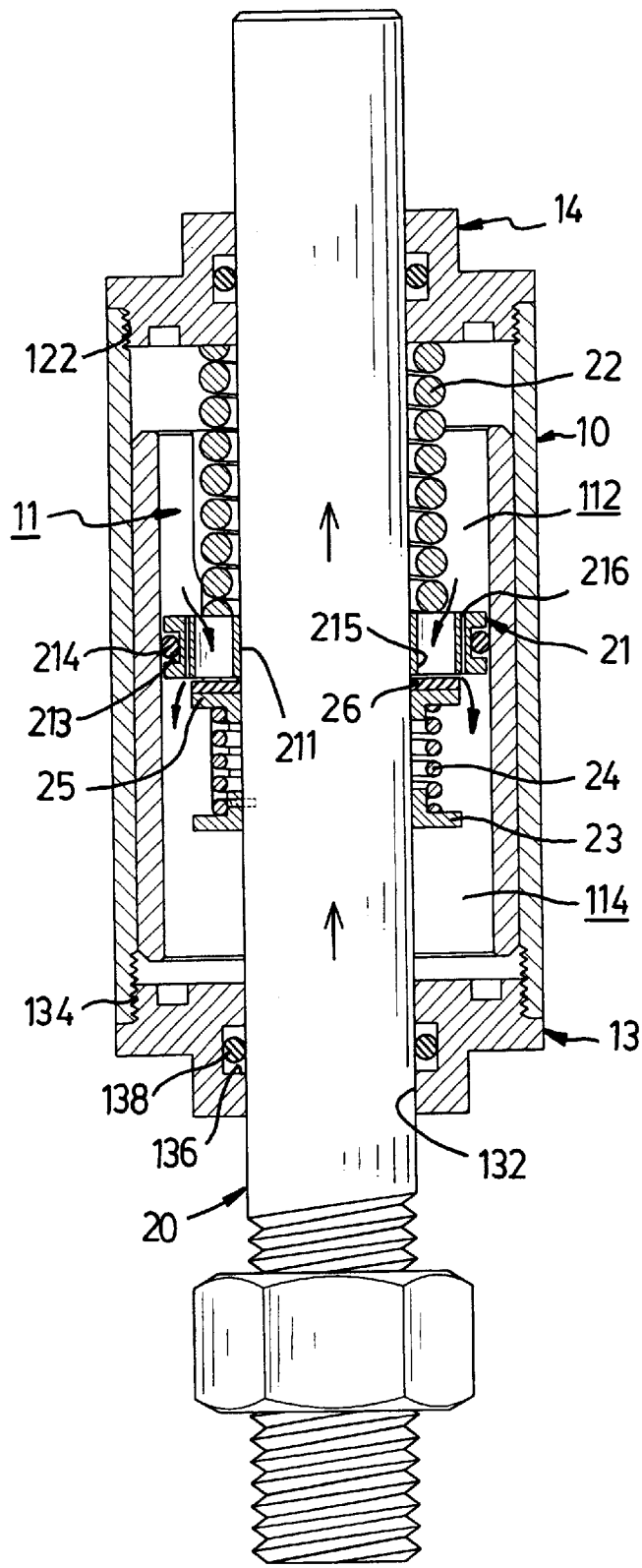
FIG. 3 is an operational side plan view in partial cross section of the first embodiment of the hydraulic damping device in FIG. 1.

In practice, the rod (20) can be connected to a wheel of a bicycle and the cylinder (10) can be connected to the frame of the bicycle, such that the hydraulic damping device serves as a shock-absorbing device for a bicycle. In operation, with reference to FIGS. 1 to 3, when a force is applied to the wheel and transmitted to the rod (20), the rod (20) will be actuated to move relative to the cylinder (10). The piston (21) will move with the rod (20) so that the first chamber (112) in the cylinder (10) is reduced and then the pressure in the first chamber (112) increases. In the meantime, the first biasing member (22) will be compressed when the piston (21) moves with the rod (20). Because the resiliency of the second biasing member (24) is smaller than that of the first biasing member (22), the seal (26) will be pushed away from the piston (21) by means of the pressure in the first chamber (112). Consequently, the first channels (215) will be opened, and the working fluid in the first chamber (112) will flow into the second chamber (114) through the first channels (215) in the piston (21). With the pressure of the working fluid in the first chamber (112), a first damping effect to the shock is provided. The first biasing member (22) can provide a second damping effect to the shock. This can keep the shock from being transmitting to the bicycle frame, and an excellent shock-absorbing effect is provided.

In addition, the damping effect can be adjusted by means of changing another first biasing member (22) with a different resiliency, such that the use of the hydraulic damping device is versatile. Accordingly, the structure of the hydraulic damping device with an adjustable capability is simple, and the cost for manufacturing the damping device is low.

When the shock is released, the piston (21) will be pushed to move back by means of the recoil force provided by the first biasing member (22). The pressure in the first chamber (112) will decrease and the working fluid will flow back to the first chamber (112) from the second chamber (114). When the piston (21) is in the backward stroke, the seal (26) will be pushed to abut against the piston (21) to close the first channels (215). The working fluid will flow back to first chamber (112) through the second channels (216) in the piston (21). Because the diameter of the second channels (216) is much smaller than that of the first channels (215), the flow rate of the working fluid flowing back to the first chamber (112) is much slower than that of the working fluid flowing into the second chamber (114) while the rod (20) is in a forward stroke. The speed of the rod (20) with the piston (21) in a backward stroke will be slowed down, and this can prevent a recoil from occurring when the piston (21) is in the backward stroke.

Figure 4:
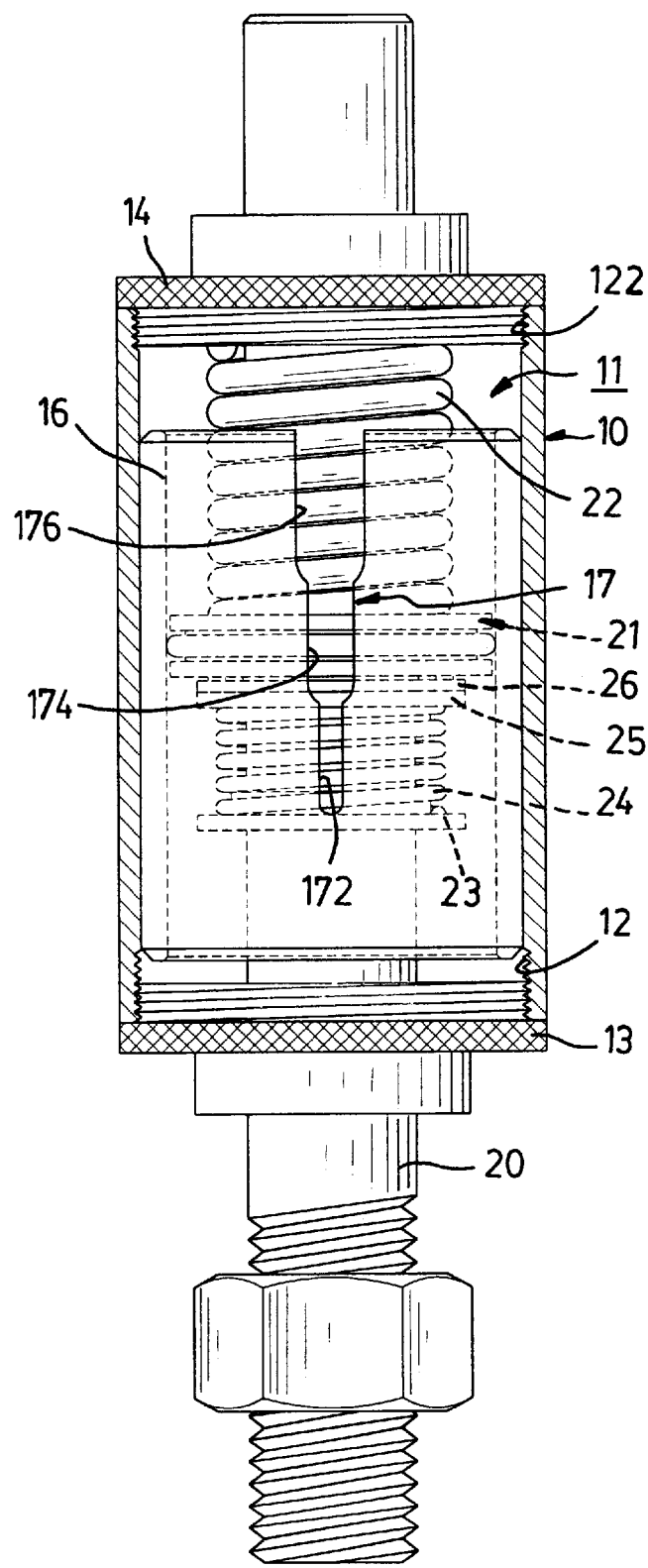
FIG. 4 is a side plan view in partial cross section of the first embodiment of the hydraulic damping device in FIG. 1 showing the feedback channel in the lining.

With reference to FIGS. 2 and 4, with the feedback channel (17) in the lining (16), the working fluid can flow back to the first chamber (112) from the second chamber (114) through the feedback channel (17). Because the feedback channel (17) has multiple segments (172,174,176) with different widths, the flow rates of the working fluid passing through different segments (172,174,176) in the feedback channel (17) are different. Thus, the flow rate of the working fluid passing through the third segment (176) is larger that of the working fluid passing through the second segment (174). This can automatically adjust the flow rate of the working fluid flowing back to the first chamber (112).

Figure 5:
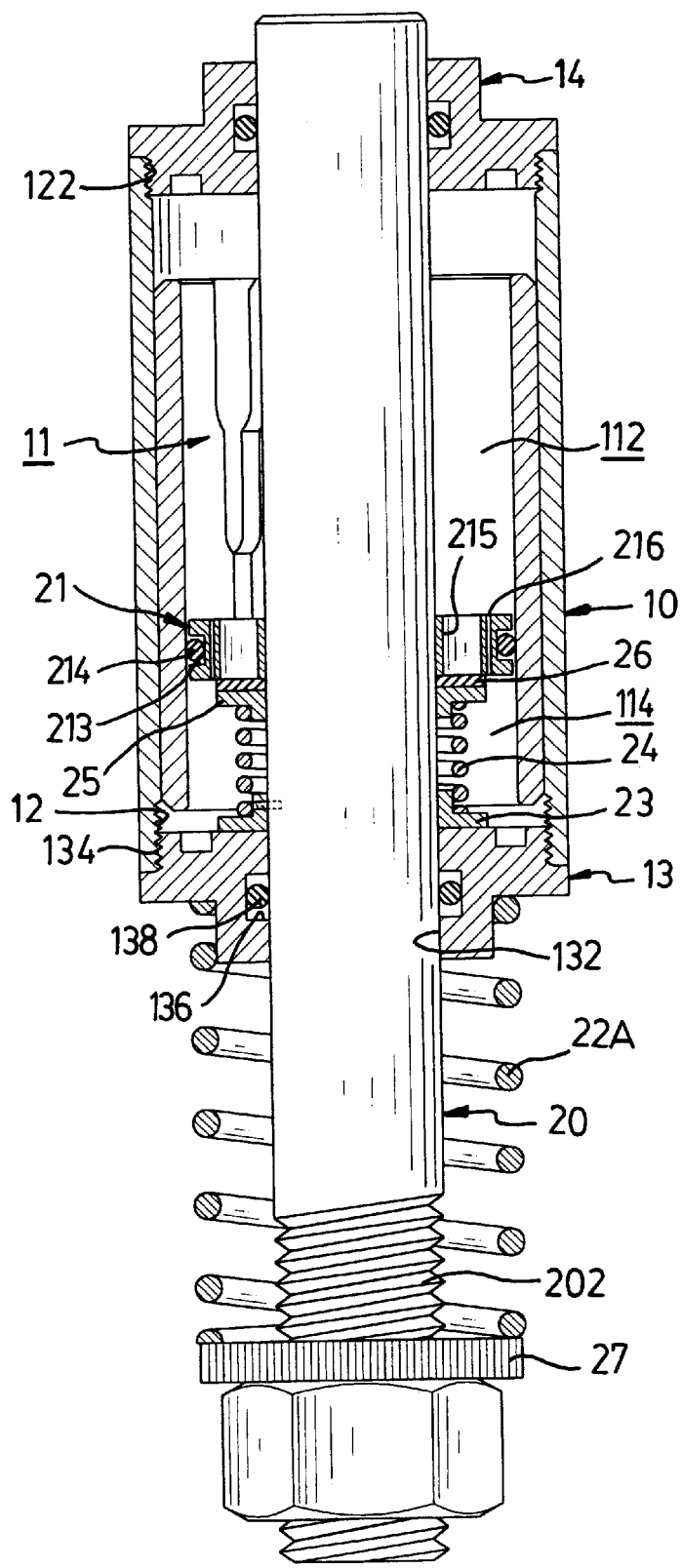
FIG. 5 is a side plan view in partial cross section of a second embodiment of a hydraulic damping device in accordance with the present invention.

With reference to FIG. 5, in a second embodiment, the rod (20) has a threaded portion (202) formed on one end far from the cylinder (10). A nut (not numbered) with a ring (27) is screwed with the threaded portion (202) on the rod (20). The first biasing member (22A) is exposed from the cylinder (10) and has two ends respectively abutting against the ring (27) and the bottom cap (13). The first biasing member. (22A) can be compressed and provide a recoil force to the rod (20) when the rod (20) is in the forward stroke.

Figure 6:
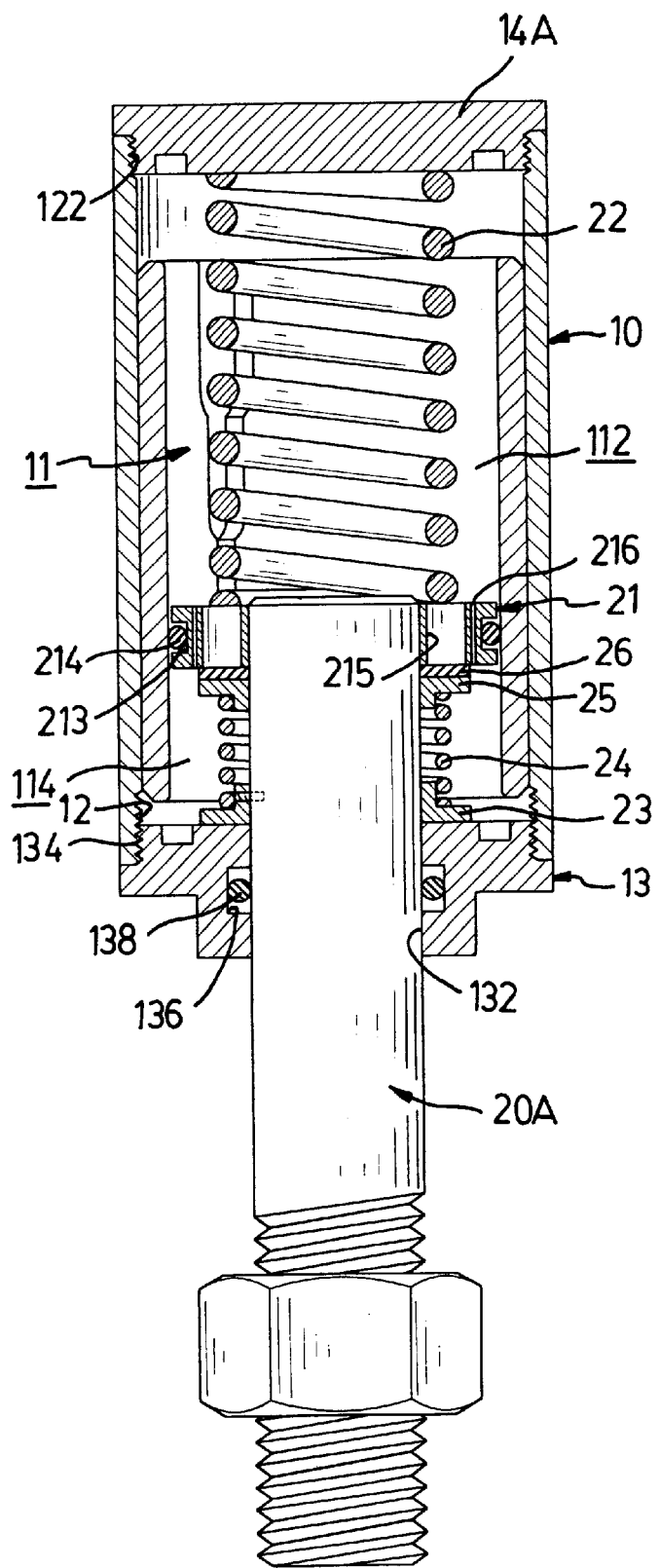
FIG. 6 is a side plan view in partial cross section of a third embodiment of a hydraulic damping device in accordance with the present invention.

With reference to FIG. 6, the top cap (14A) closes the top end (122) of the cylinder (10) and does not have a central hole. The end of the rod (20A) extending into the cylinder (10) does not extend out from the top cap (14A), and the piston (21) is secured to the end of the rod (20A). The first biasing member (22) is received in the first chamber (112) in the cylinder (10) and has two ends respectively abutting against the piston (21) and the top cap (14A). In such an arrangement, the first biasing member (22) can also provide a recoil force to the rod (20A).

Figure 7:
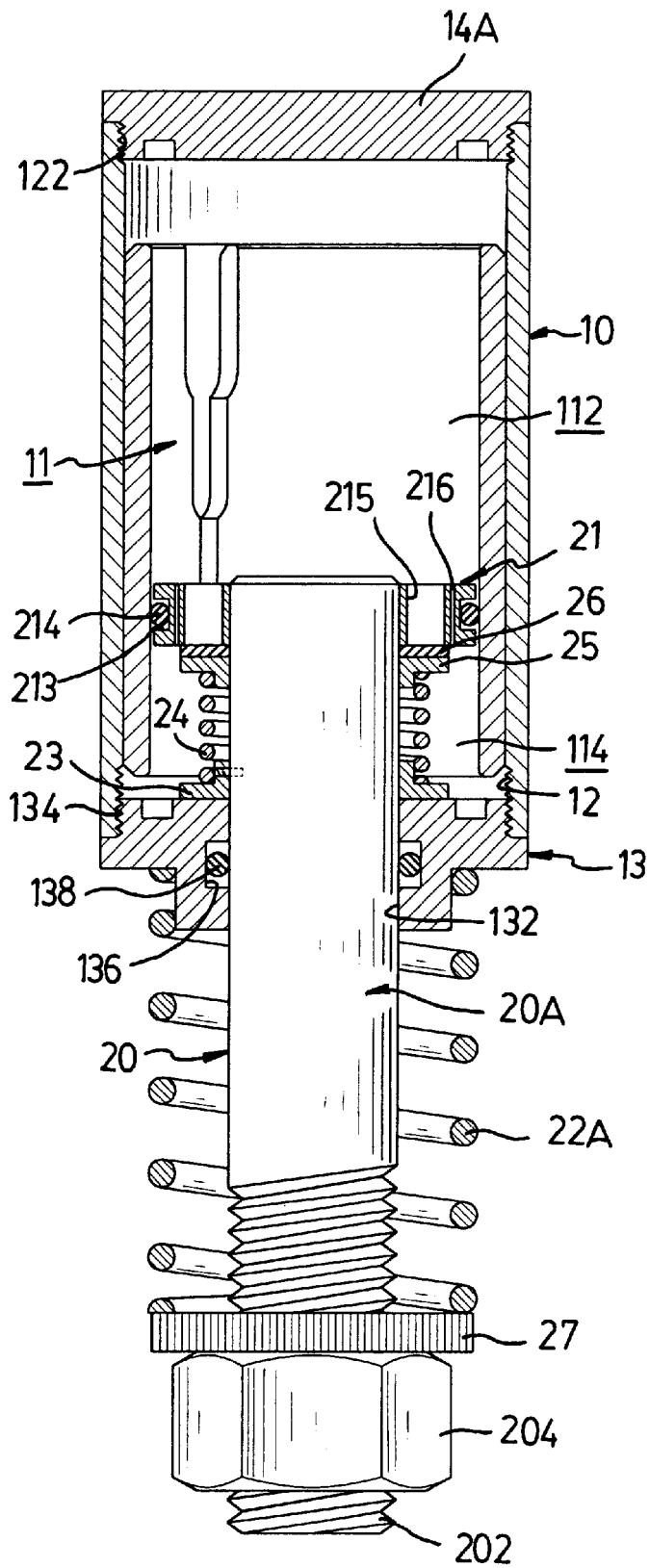
FIG. 7 is a side plan view in partial cross section of a fourth embodiment of a hydraulic damping device in accordance with the present invention.

With reference to FIG. 7, the top cap (14A) closes the top end (122) of the cylinder (10) and does not have a central hole. The end of the rod (20A) extending into the cylinder (10) does not extend out from the top cap (14A), and the piston (21) is secured to the end of the rod (20A). The rod (20A) has a threaded portion (202) formed on one end far from the cylinder (10). A nut (204) with a ring (27) is screwed with the threaded portion (202) on rod (20A). The first biasing member (22A) is exposed from the cylinder (10) and has two ends respectively abutting against the bottom cap (13) and the ring (27).

Figure 8:
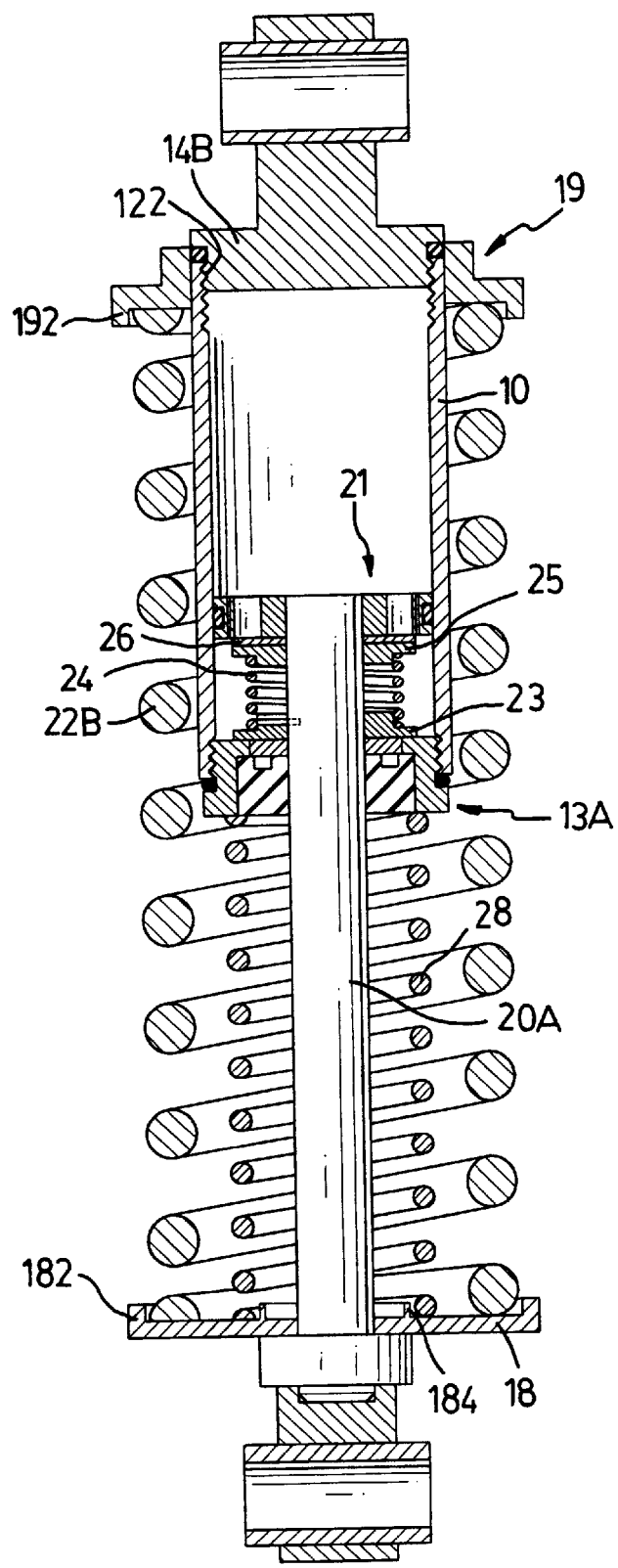
FIG. 8 is a side plan view in partial cross section of a fifth embodiment of a hydraulic damping device in accordance with the present invention.

With reference to FIG. 8, a lower holder (18) is mounted on the end of the rod (20A) far from the cylinder (10). An upper holder (19) is mounted on the top end (122) of the cylinder (10). The first biasing member (22B) is exposed from the cylinder (10) and has two ends respectively abutting against the upper holder (19) and the lower holder (18). The upper holder (19) has a skirt (192) formed around the upper holder (19) to hold the corresponding end of the first biasing member (22B). The lower holder (18) has a skirt (182) formed around the lower holder (18) to hold the corresponding end of the first biasing member (22B).

A third biasing member (28) with a resiliency is mounted between the rod (20A) and the cylinder (10), and co-axially between the rod (20A) and the first biasing member (22B). The resiliency of the third biasing member (28) is smaller than the resiliency of the first biasing member (22B), and the third biasing member (28) has two ends respectively abutting against the lower holder (18) and the bottom cap (13A). The lower holder (18) has an annular flange (184) formed on the lower holder (18) to hold the corresponding end of the third biasing member (28). With the arrangement of the third biasing member (28), the damping effect of the damping device is changed and adjustable by means of changing the biasing members (22B, 28) with different resiliencies.

Figure 9:
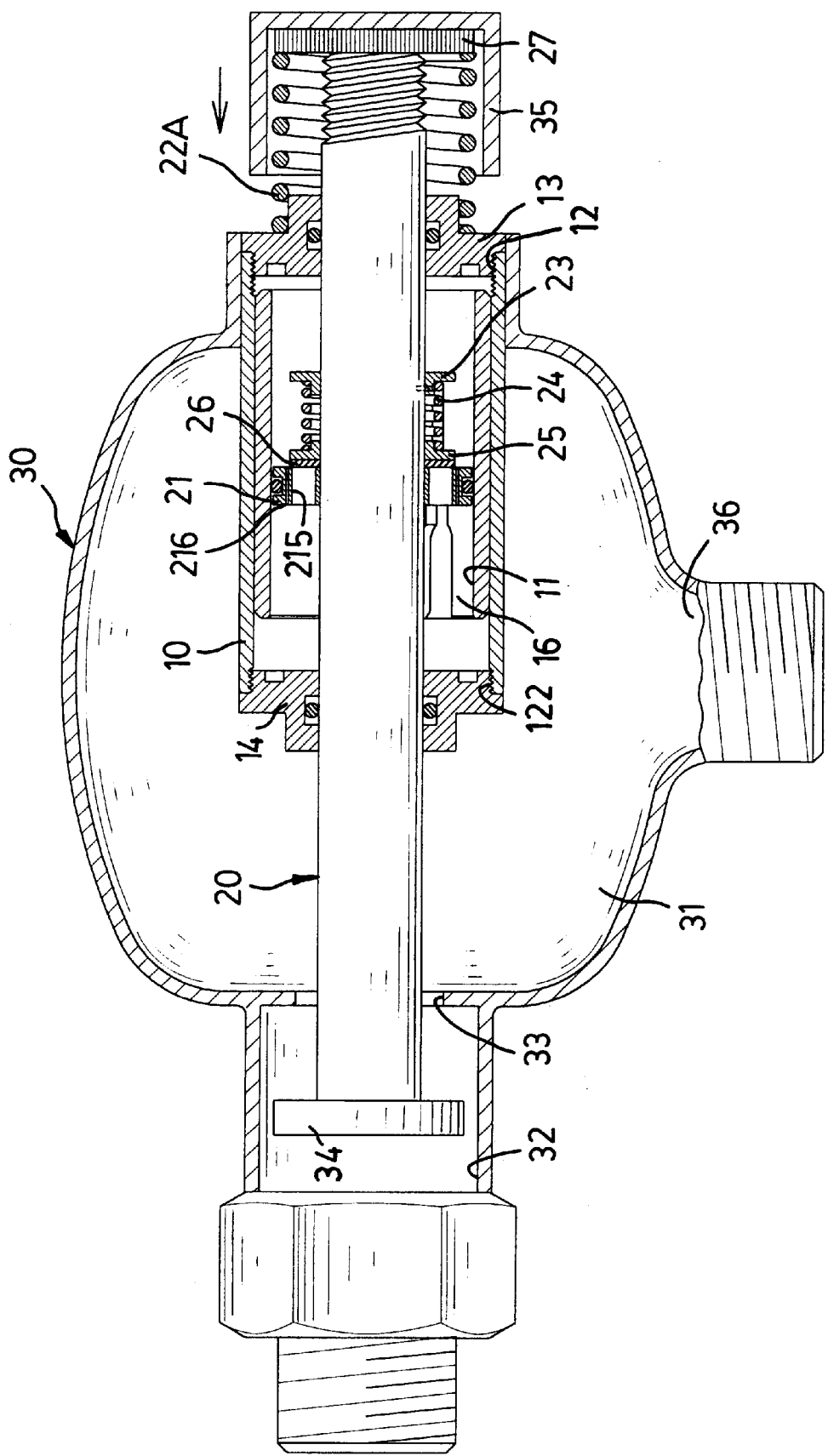
FIG. 9 is a side plan view in partial cross section of a flow controller with the first embodiment of the hydraulic damping device in FIG. 1.

With reference to FIG. 9, the damping device in accordance with the present invention can be construed of a flow controller in a flow discharging system. In this operational embodiment, the cylinder (10) is received in a housing (31), of a liquid-discharging device (30) with an inlet (32) and an outlet (36). One end of the rod (20) extends through a bore (33) in the housing (31) and into the inlet (32), and a valve plate (34) mounted on the end of the rod (20) is adapted to close the bore (33). The other end of the rod (20) has a ring (27) threadingly received thereon, and the first biasing member (22A) is mounted between the bottom cap (13) on the cylinder (10) and the ring (27). A push button (35) is attached to the ring (27). Consequently, when the user presses the push button (35), the rod (20) with the piston. (21) will move relative to the cylinder (10), and the valve plate (34) will leave the bore (33) so as to open the bore (33). Accordingly, the fluid will be discharged from the outlet (36) through the inlet (32), the bore (33) and the housing (31). Because the damping device in accordance with the present invention has a slow backward stroke, an amount of time is needed for the plate valve (34) to move to the position where it closes the bore (33). Therefore, a desired amount of liquid will be discharged from the discharging device (30), and the damping device in accordance with the present invention can be used to control the flow rate and discharging amount of the liquid.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hydraulic damping device comprising:
    a cylinder with an inner space, a top end, a bottom end and an axial direction;
    a top cap and a bottom cap respectively attached to the top end and the bottom end of the cylinder;
    a rod moveably extending through the bottom cap and into the inner space in the cylinder;
    a piston securely attached to the rod and received in the cylinder to divide the inner space in the cylinder into a first chamber and a second chamber, the piston having multiple first channels defined through the piston and communicating with the first chamber and the second chamber in the cylinder and multiple second channels defined through the piston and communicating with the first chamber and the second chamber in the cylinder, wherein each first channel has a diameter larger than a diameter of each second channel;
    a working fluid contained in the inner space of the cylinder at an original pressure;
    a seal moveably mounted on the rod, received in the second chamber and abutting against the piston to close the first channels in the piston;
    a first biasing member with a resiliency connected to the rod to provide a recoil force to the rod; and
    a second biasing member with a resiliency mounted on the rod to provide a force to push the seal to abut against the piston,
    wherein the resiliency of the second biasing member is smaller than the resiliency of the first biasing member.

2. The hydraulic damping device as claimed in claim 1, wherein the bottom cap has a central hole with an inner surface defined through the bottom cap;
    the top cap has a central hole with an inner surface defined through the top cap; and
    the rod has a first end and a second end extending through the central holes in the bottom cap and the top cap and out from the cylinder.

3. The hydraulic damping device as claimed in claim 2, wherein the first biasing member is received in the first chamber in the cylinder and has two ends respectively abutting against the piston and the top cap.

4. The hydraulic damping device as claimed in claim 2, wherein the rod has a threaded portion formed on the first end of the rod;
    a nut with a ring screwed with the threaded portion on the rod; and
    the first biasing member is exposed from the cylinder and has two ends respectively abutting against the ring and the bottom cap.

5. The hydraulic damping device as claimed in claim 2, wherein an annular recess is defined in the inner surface of the central hole in the top cap;
    an O-ring is received in the annular recess in the top cap and mounted around the rod;
    an annular recess is defined in the inner surface of the central hole in the bottom cap; and
    an O-ring is received in the annular recess in the bottom cap and mounted around the rod.

6. The hydraulic damping device as claimed in claim 1, wherein the bottom cap has a central hole defined through the bottom cap;
    the rod has a first end and a second end that extends through the central hole in the bottom cap and into the cylinder; and
    the piston is secured to the second end of the rod.

7. The hydraulic damping device as claimed in claim 6, wherein the first biasing member is received in the first chamber in the cylinder and has two ends respectively abutting against the piston and the top cap.

8. The hydraulic damping device as claimed in claim 6, wherein the rod has a threaded portion formed on the first end of the rod;
    a nut with a ring screwed with the threaded portion on the rod; and
    the first biasing member is exposed from the cylinder and has two ends respectively abutting against the ring and the bottom cap.

9. The hydraulic damping device as claimed in claim 6, wherein the rod has a lower holder mounted on the first end of the rod;

the cylinder has an upper holder mounted on the top end; and the first biasing member is exposed from the cylinder and has two ends respectively abutting against the upper holder and the lower holder.

10. The hydraulic damping device as claimed in claim 9, wherein the upper holder has a skirt formed around the upper holder to hold the corresponding end of the first biasing member; and the lower holder has a skirt formed around the lower holder to hold the corresponding end of the first biasing member.

11. The hydraulic damping device as claimed in claim 10 further comprising a third biasing member with a resiliency mounted between the rod and the cylinder, wherein the resiliency of the third biasing member is smaller than the resiliency of the first biasing member;

the third biasing member has two ends respectively abutting against the lower holder and the bottom cap; and the lower holder has an annular flange formed on the lower holder to hold the corresponding end of the third biasing member.

12. The hydraulic damping device as claimed in claim 9 further comprising a third biasing member with a resiliency mounted between the rod and the cylinder, wherein the resiliency of the third biasing member is smaller than the resiliency of the first biasing member.

13. The hydraulic damping device as claimed in claim 6, wherein an annular recess defined in the inner surface of the central hole in the bottom cap;

an O-ring is received in the annular recess in the bottom cap and mounted around the rod.

14. The hydraulic damping device as claimed in claim 1 further comprising a tubular lining mounted in the cylinder and having an inner surface; and the piston has an outer periphery abutting against the inner surface of the lining.

15. The hydraulic damping device as claimed in claim 14, wherein the lining has a feedback channel longitudinally defined in the inner surface of the lining along the axial direction of the cylinder.

16. The hydraulic damping device as claimed in claim 15, wherein the feedback channel comprises a first segment with a width, a second segment with a width and a third segment with a width linearly arranged from one end of the lining far from the top cap, wherein the width of the first segment is smaller than the width of the second segment; and the width of the second segment is smaller than the width of the third segment.

17. The hydraulic damping device as claimed in claim 14, wherein an annular recess is defined in the outer surface of the piston; and an O-ring is received in the annular recess in the piston and abuts against the inner surface of the lining.

18. The hydraulic damping device as claimed in claim 1 further comprising a pushing base moveably mounted on the rod and abutting against the seal; and a securing base secured to the rod, wherein the second biasing member has two ends respectively abutting against the pushing base and the securing base.

* * * * *